United States Patent [19]

Hayashi

[11] Patent Number: 4,783,180

[45] Date of Patent: Nov. 8, 1988

[54] BEARING ASSEMBLY FOR VEHICLE

[75] Inventor: Yoshitaka Hayashi, Fujisawa, Japan

[73] Assignee: Nippon Seiko Kabushiki Ksiahs, Tokyo, Japan

[21] Appl. No.: 102,670

[22] Filed: Sep. 30, 1987

[30] Foreign Application Priority Data

Oct. 9, 1986 [JP] Japan .................... 61-154408

[51] Int. Cl.⁴ ............................................ F16C 19/08
[52] U.S. Cl. ................................. 384/448; 384/480; 384/446
[58] Field of Search ............... 384/448, 446, 484, 480, 384/485, 482, 512; 340/682

[56] References Cited

U.S. PATENT DOCUMENTS

| | | | |
|---|---|---|---|
| 4,063,786 | 12/1977 | Ratt | 340/682 |
| 4,092,053 | 5/1978 | Riegler | 384/448 |
| 4,093,324 | 6/1978 | Carrigan | 384/480 |
| 4,688,951 | 8/1987 | Guers | 384/448 |
| 4,732,494 | 3/1988 | Guers | 384/446 |

Primary Examiner—Lenard A. Footland
Attorney, Agent, or Firm—Shapiro and Shapiro

[57] ABSTRACT

A bearing assembly for a vehicle includes an inner race made integral with the wheel, and an outer race disposed outside and concentrically with the inner race with rolling members interposed therebetween. The inner race is adapted to rotate relative to the outer race. The bearing assembly further includes an annular member including a fixed portion fixedly fitted to the outer peripheral surface of the outer race, an extension extending continuously to the fixed portion and extending while surrounding the outer race to form a desired seal portion between itself and the outer race, and a pulser gear portion comprising a plurality of concave and convex portions formed on the extension and provided circumferentially at intervals, and a sensor is disposed in proximity to the pulser gear portion, whereby the number of rotations of the wheel can be detected.

5 Claims, 3 Drawing Sheets

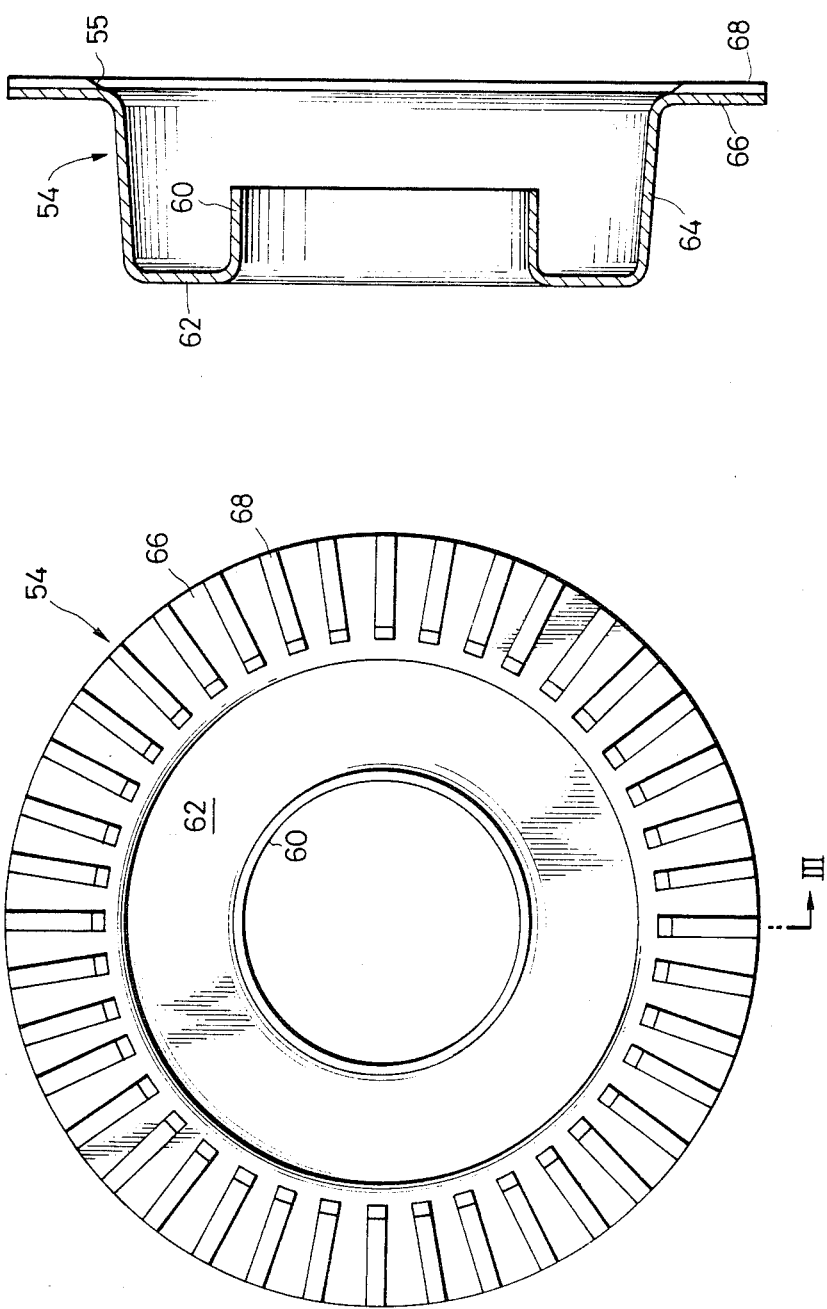

BEARING ASSEMBLY FOR VEHICLE

BACKGROUND OF THE INVENTION

1. Field of the Invention

The present invention relates to improvements in a bearing assembly for a wheel provided with speed detecting means, that is, a bearing assembly provided with a pulser gear for detecting the number of rotations of the wheel.

2. Related Background Art

In the brakes are suddenly applied when a vehicle is running, particularly, when the vehicle is running on a snowy road or ice in wintertime, the wheels of the vehicle may be locked before the vehicle stops. If in such case, the rear wheels are locked, stability will be reduced, and if the front wheels are locked, maneuverability will be lost, and in any case, the vehicle will become a very unstable condition.

In order to prevent such a phenomenon, there is known a so-called anti-lock apparatus in which a pulser gear is fixed to a rotatable wheel rotatable with the wheel of a vehicle and the number of rotations of the wheel is sensed by a sensor to thereby control the braking force of the wheel.

Heretofore, a plurality of balls have been interposed, for example, between an outer race and an inner race which are rotalable with the wheel, and a pulser gear having concave and convex portions alternately formed circumferentially on the outer peripheral surface thereof has been mounted on the outer race, and the number of rotations of the wheel has been detected by a sensor disposed in proximity to pulser gear.

However, with a bearing whose inner race is rotated by the running of the vehicle, it is impossible in the above-described method to measure the speed of the vehicle. Also, where a seal member is used to prevent muddy water from entering into the interior of the bearing, the sliding portion (for example, the inner race) of the seal lip becomes rusty due to muddy water or the like, and this leads to the problem that the sealing effect is reduced to reduce the service life of the bearing.

SUMMARY OF THE INVENTION

The present invention has been made with a view to eliminate the above-noted problem peculiar to the prior art, that is, to prevent the seal sliding surface in a bearing assembly for a wheel from rusting.

In the present invention, an annular member provided with a pulser gear also forms a seal portion (which may be of the contact type or the now-contact type) between it and the outer race. That is, the annular member is fixedly fitted to the inner race, and a seal portion is formed between the portion surrounding the outer race and the outer race and a pulser gear portion is formed on the outer peripheral edge thereof.

According to the present invention, the seal portion of the bearing is protected by an annular member provided with a pulser gear for detecting the number of rotations (the speed) of the wheel so that it is not exposed to rainwater or muddy water and therefore, the entry of muddy water or the like into the bearing is prevented and the lip sliding surface of the seal member is prevented from rusting and thus, the service life of the bearing is improved. Moreover, this can be accomplished without substantially changing the structure of the conventional bearing assembly, and in some cases, while utilizing it.

BRIEF DESCRIPTION OF THE DRAWINGS

FIG. 2 is a front view of a second annular member (54) in the first embodiment.

FIG. 3 is a cross-sectional view taken along line III—III in FIG. 2.

DESCRIPTION OF THE PREFFERRED EMBODIMENTS

Some embodiments of the present invention will hereinafter be described with reference to the drawings The present invention can of course be suitably changed and improved within a scope which does not mar the gist thereof.

Figure 1:
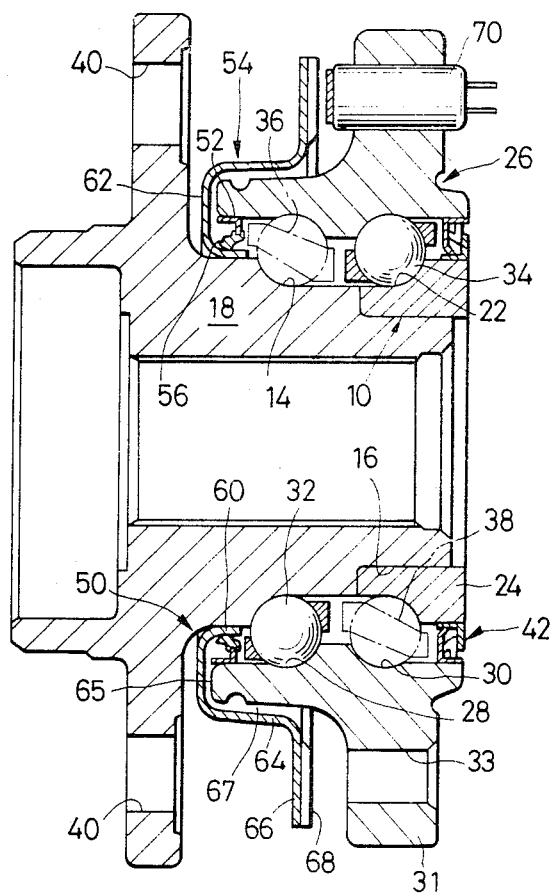
FIG. 1 is a front cross-sectional view showing a first embodiment of the present invention.

Referring to FIG. 1 which is a front cross-sectional view of a bearing assembly, reference numeral 10 designates an inner race which comprises a body 18 having a radially outwardly extending flange portion 12, a ball track groove 14 and a stepped portion 16 at one end thereof, and an annular member 24 fitted to the stepped portion 16 and having a ball track groove 22. An outer race 26 is disposed outside and concentrically with the inner race 10, and has ball track grooves 28 and 30 opposed to said ball track grooves 14 and 22, respectively, and a radially outwardly extending protrusion 31. A plurality of balls 32 and 34 and retainers 36 and 38 are interposed between the pair of opposed ball track grooves 14 and 28 and between the pair of opposed ball track grooves 22 and 30, respectively.

The bearing comprising the inner race 10, the outer race 26 and the balls 32, 34 is a so-called double row angular contact bearing and is mounted on a brake drum and a disk brake by means of a bolt, not shown, extending through a through-hole 40 in the flange portion 12.

A seal member 42 is interposed between one end (the right end as viewed in FIG. 1) of the annular member 24 of the inner race 10 and that portion of the outer race 26 which is opposed thereto, to prevent rainwater from entering into the interior of the bearing through this gap.

A seal member 50 is interposed between the other end (the left end as viewed in FIG. 1) of the outer race 26 and that portion of the inner race body 18 which is opposed thereto, and this seal member 50 comprises a first annular member 52 of L-shaped cross-section fitted to the outer race 26, a second annular member 54 made of a metal and fitted to the inner race body 18, and an elastic member 56 interposed between the two annular members. The second annular member 54, as shown in FIGS. 2 and 3, has a first cylindrical portion 60 extending parallel to the axis thereof, a first flange portion 62 extending radially outwardly therefrom, a second cylindrical portion 64 extending parallel to a first cylindrical portion 60 therefrom, a second flange portion 66 extending parallel to the first flange portion 62 therefrom, and a number of radial convex portions 68 formed circumferentially at predetermined intervals on that surface of the second flange portion 66 which is opposite to the surface thereof on which the second cylindrical portion 64, etc. are present. These convex portion 68 are formed by press-forming magnetic metal plate with a tapered surface 55 thereof being abutted against a molding (not shown). However, it is possible to form through holes by press-forming instead of the convex portion 68.

The second annular member 54, as shown in FIG. 1, is mounted to the inner race 10, i.e., the bearing, with the first cylindrical portion 60 fitted to the inner race body 18, the first flange portion 62 extends proximately to the end portion of the outer race 26, and the second cylindrical portion 64 extends proximately to the outer peripheral surface of the outer race 26, each of them forming labyrinth seals 65 and 67. The second flange portion 66 extends proximately to the surface of the outer race protrusion 31.

The protrusion 31 is formed with a through-hole 33 in the axial direction thereof, in which a sensor 70 is mounted and is proximate and opposed to the second flange portion 66 and the convex portions 68 thereon.

Operation of the present embodiment will now be described. When wheels are rotated, the inner race 10 is rotated relative to the outer race 26 by the rolling of the balls 32 and 34 through the bolt extending through the through-hole 40. During the rotation of the inner race 10, the second annular member 54 rotates therewith (the first annular member 52 does not rotate) and the convex portions 68 on the second flange portion 66 successively pass the front of the sensor 70 and therefore, by calculating the frequency of passage of the convex portions 68 per unit time, it is possible to detect the speed of rotation of the wheel made integral with the second annular member 54, i.e., the inner race 10.

As regards the entry of rainwater into the interior of the bearing, the convex portions 68 on the second flange portion 66 are formed radially and therefore, even if rainwater collects in the concave portions between adjacent convex portions, such rainwater will be sling off radially outwardly by a centrifugal force based on the rotation of the second annular member 54 (the water shake-off effect). Also, since the labyrinth seals 65 and 67 are formed in mutually orthogonal directions between the first flange portion 62 and the second cylindrical portion 64 and the outer race 26, it is difficult for rainwater to reach the location between the left end portion of the outer race 26 and that portion of the inner race body 18 which is opposed thereto Moreover, even if rainwater reaches this location, the entry of the rainwater into the interior of the bearing will be prevented by a seal member formed by the first cylindrical portion 60 of the first annular member 52, the second annular member 54 and the elastic member 56.

Also, during the rotation of the inner race 10, the second annular member 54 rotates therewith and the outer peripheral surface of that portion which is contacted by the elastic member 56 (the first cylindrical portion 60) provides a seal sliding surface. However, as described above, it is difficult for rainwater or muddy water to reach the seal member 50 and therefore, this seal sliding surface is prevented from being damaged and the sealing property is improved Second and third embodiments of the present invention will now be described with reference to FIGS. 4 and 5.

Figure 4:
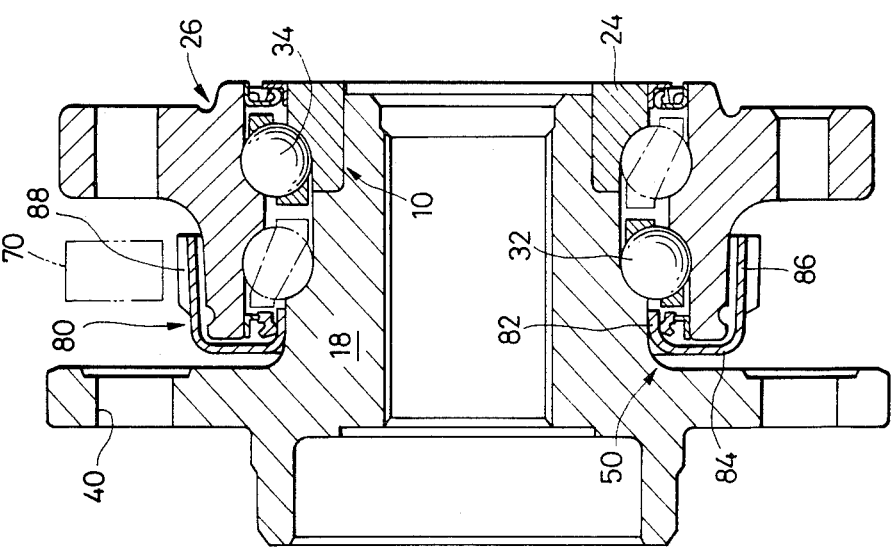

A feature of the second embodiment shown in FIG. 4 is that a second annular member 80 comprises a first cylindrical portion 82 fitted to an inner race body 18, a first flange portion 84 extending therefrom along the end surface of an outer race 26 and a second cylindrical portion 86 extending therefrom along the outer peripheral surface of the outer race 26, and convex portions 88 are provided circumferentially at intervals on the second cylindrical portion. Thus, the sensor 70 is disposed radially of the outer race 26 as indicated by dots-and-dash line in FIG. 4.

According to this embodiment, the construction of the second annular member 80 is simple and the manner in which the sensor 70 is disposed is flexible.

Figure 5:
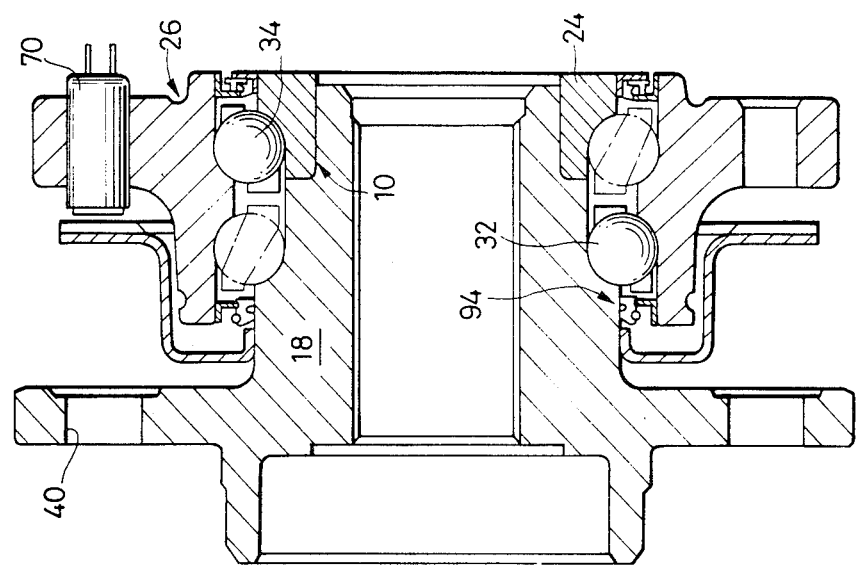
FIGS. 4 and 5 are front cross-sectional views showing a second and a third embodiment, respectively, of the present invention.

Next, in the embodiment shown in FIG. 5, the construction of a second annular member 90 is similar to that in the embodiment shown in FIGS. 1–3, whereas a first cylindrical portion 92 fitted to the inner race body 18 does not constitute a seal member 94, but the seal member 94 is constituted by a first annular member 52 and an elastic member 56.

According to this embodiment, the seal member 94 and speed detecting means bear their functions discretely and therefore, the construction of each of them is simple and the operation thereof is also stable.

I claim:

1. A bearing assembly for a wheel including an inner race made integral with the wheel, and an outer race disposed outside and concentrically with said inner race with rolling members interposed therebetween, said inner race being adapted to rotate relative to said outer race, characterized in that said bearing assembly includes an annular member including a fixed portion fixedly fitted to the outer peripheral surface of said outer race, an extension extending continuously to said fixed portion and extending while surrounding said outer race to form a desired seal portion between itself and said outer race, and a pulser gear portion, comprising a plurality of concave and convex portions formed on said extension and provided circumferentially at intervals, and a sensor is disposed in proximity to said pulser gear portion, whereby the number of rotations of the wheel can be detected.

2. A bearing assembly for a wheel including an inner race made integral with the wheel, and an outer race disposed outside and concentrically with said inner race with rolling members interposed therebetween, said inner race being adapted to rotate relative to said outer race, characterized in that said bearing assembly includes an annular member including a fixed portion fixedly fitted to the outer peripheral surface of said outer race, at least one radial extension and at least one axial extension extending sideways and outwardly of said outer race continuously to said fixed portion and forming a labyrinth seal between itself and said outer race, and a pulser gear portion comprising a plurality of concave and convex portions formed on one of said radial extension and said axial extension and provided circumferentially at intervals, said annular member is made by press-working a plate-like member, and a sensor is disposed in proximity to said pulser gear portion, whereby the number of rotations of the wheel can be detected.

3. A bearing assembly according to claim 2, wherein between said inner race and said outer race, a seal member is interposed on each of the axially outer sides of the rolling members, and the fixed portion of said annular member forms a part of said seal member.

4. A bearing assembly according to claim 3, wherein said annular member comprises a cylindrical fixed portion, a first radial extension extending radially outwardly therefrom, an axial extension extending axially therefrom, and a second radial extension extending radially outwardly therefrom, said first radial extension extends sideways of said outer race, said axial extension extends outwardly of said outer race, and said pulser gear portion is formed on said second radial extension.

5. A bearing assembly according to claim 3, wherein said annular member comprises a cylindrical fixed portion, a radial extension extending radially outwardly therefrom, and an axial extension extending axially therefrom, said radial extension extends sideways of said outer race, said axial extension extends outwardly of said outer race, and said pulser gear portion is formed on said axial extension.

* * * * *